Aug. 9, 1938.  L. O. McLEAN  2,126,404
PORTABLE POWER SHOVEL AND THE LIKE
Filed July 18, 1936  3 Sheets-Sheet 1

INVENTOR.
Leland O. McLean,
Edward A. Lawrence,
BY
his ATTORNEY.

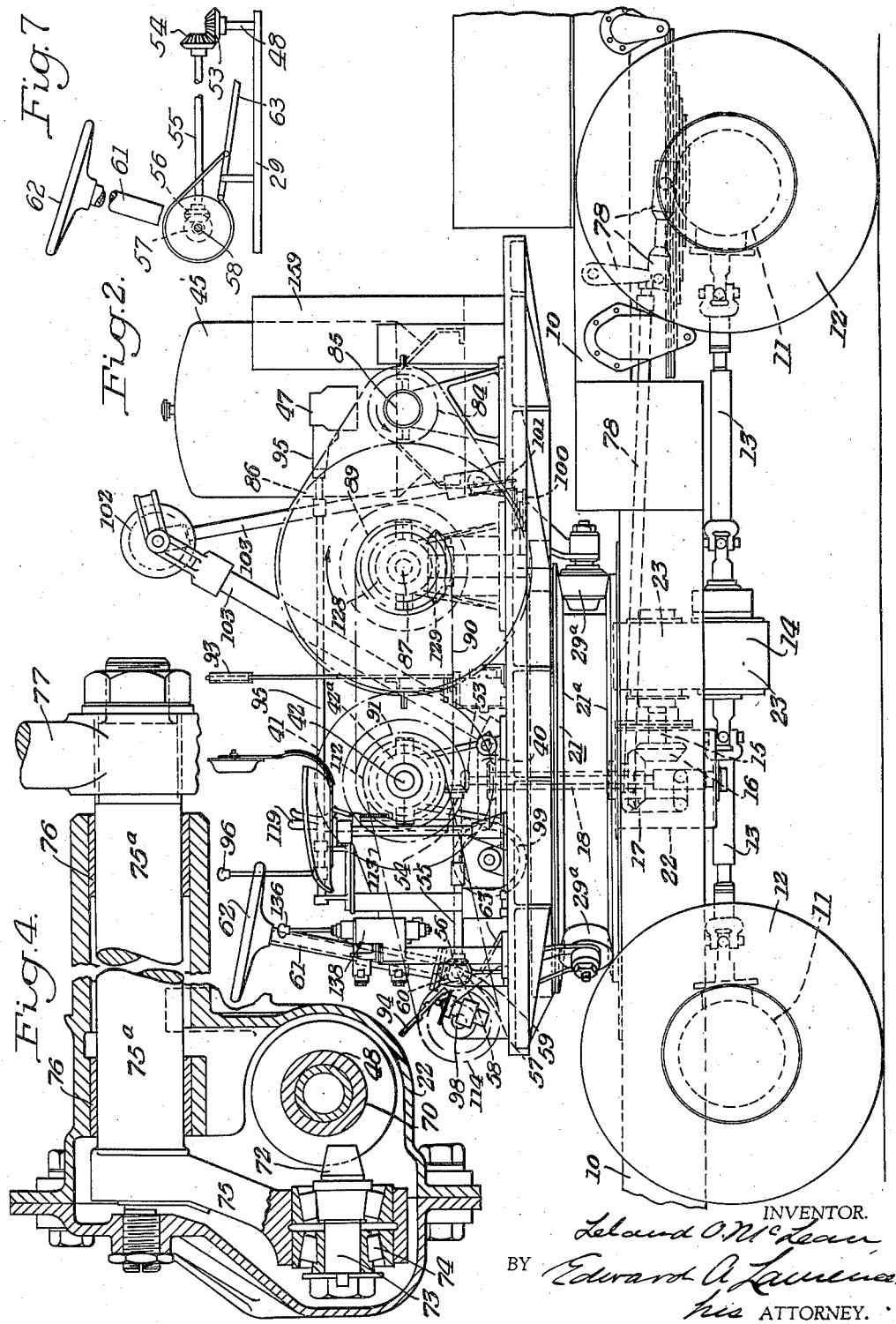

Aug. 9, 1938.  L. O. McLEAN  2,126,404
PORTABLE POWER SHOVEL AND THE LIKE
Filed July 18, 1936  3 Sheets-Sheet 3
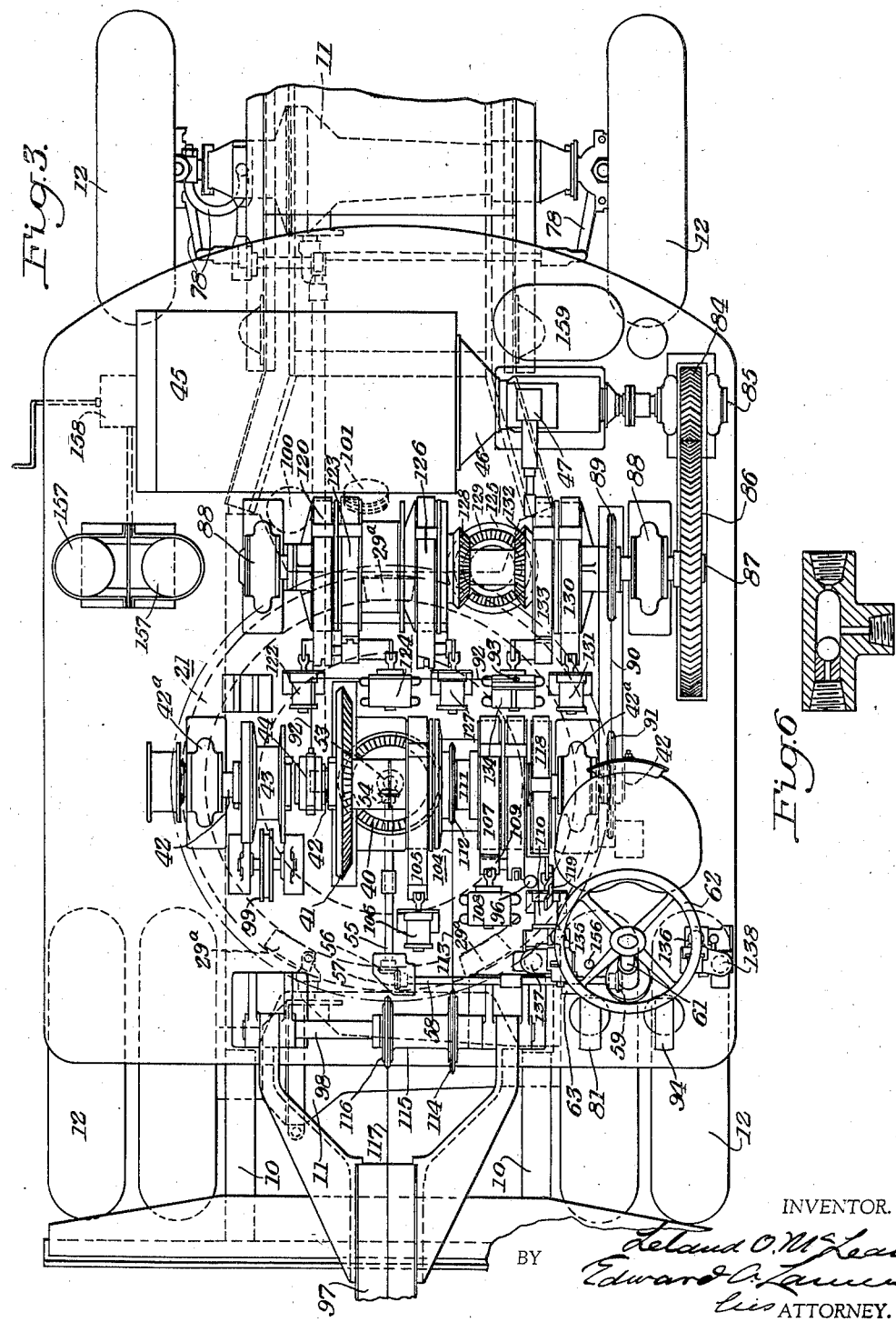
INVENTOR.
Leland O. McLean,
BY Edward A. Lawrence
his ATTORNEY.

Patented Aug. 9, 1938

2,126,404

UNITED STATES PATENT OFFICE 2,126,404

PORTABLE POWER SHOVEL AND THE LIKE

Leland O. McLean, Pittsburgh, Pa., assignor to Lidgerwood Manufacturing Company, Elizabeth, N. J., a corporation of New York Application July 18, 1936, Serial No. 91,378

3 Claims. (Cl. 180—79.3)

My invention relates to the operation of power vehicles which are provided with a rotary table, such as power-shovels, power-cranes, dump trucks and the like.

One of the objects which I have in view is the provision of practical means whereby the operator may drive, steer, and operate the brakes of the vehicle in travel, from the same position on the rotary table from which he operates the table-turning mechanism, and the mechanism for operating the shovel, crane, dumping or other devices.

In four-wheeled vehicles of this type the operator has been stationed on a non-rotary portion of the vehicle during the travel of the vehicle from one location to another; but to turn the table and operate the crane or shovel, it has been necessary for him to change his station and to take a position on the rotary table. This involves loss of time and an inconvenient separation of the various controls.

Again in the present four-wheeled vehicles of this type the motor is positioned on the chassis and thus does not turn with the rotary table. This requires complicated driving connections for turning the table and performing the other operative functions.

In my present invention the motor of the four-wheeled vehicle is mounted on the rotary table as is the operator, and thus the power connections for rotating the table and for operating the other mechanisms, such as the crane or shovel, are simplified, and I drive, steer and operate the brakes of the vehicle through a unitary assembly which is disposed axially of the rotary table.

This arrangement enables me to successfully apply the four-wheel truck principle to vehicles of this general character, thus obtaining greater speed and convenience of travel as compared to the endless track propulsion type of vehicle, sometimes called by the trade name "caterpillar", which is steered by manipulating the brakes.

This also enables me to employ a four-wheel drive for the vehicle. This is an important feature because in these operations frequently the front or rear wheels are on soft or slippery ground without sufficient traction, and thus with a two-wheel drive the vehicle might be stalled.

Again I have invented a new and improved arrangement and assembly for driving, steering and manipulating the brakes from the operator's station on the rotary table.

Other novel features of construction, and also of arrangement of parts, will appear from the following description.

In the accompanying drawings, wherein I have illustrated a practical embodiment of the principles of my invention, Fig. 1 is a vertical section showing the unitary assembly of the drive, steering and brake control mechanism disposed axially of the revolving table, parts being broken away.

Fig. 2 is a side elevation of a power-shovel embodying the principles of my invention, certain parts being broken away.

Fig. 3 is a plan view of the same.

Fig. 4 is a sectional view taken along the line 4—4 in Fig. 1.

Fig. 6 is a sectional view of one of the double acting ball valves.

Fig. 7 is a detailed view illustrating a portion of the steering apparatus.

Figures 1, 5:
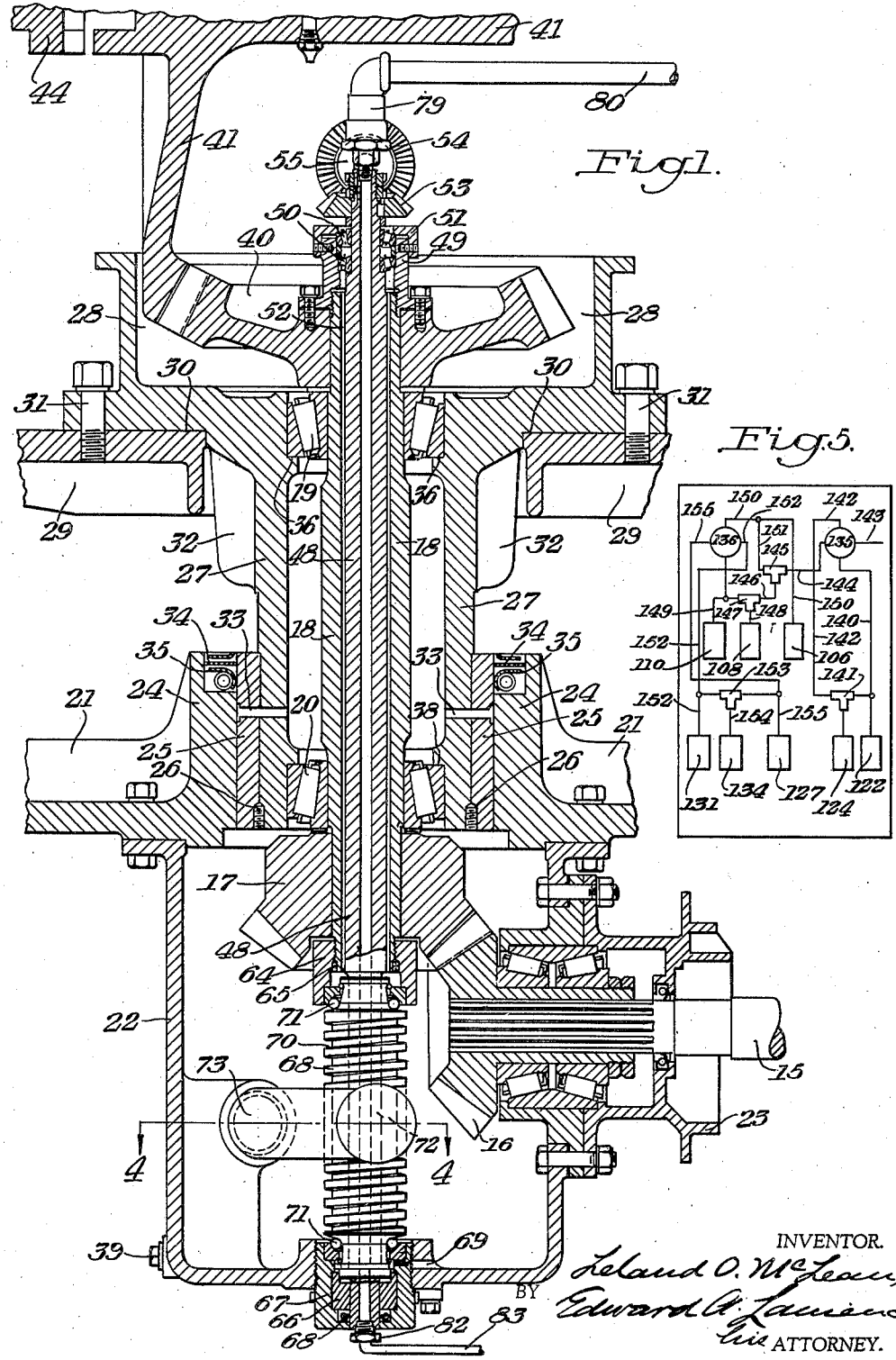
Fig. 5 is a diagrammatic view showing the air control connections.

Referring to the drawings, 10 represents the chassis frame having front and rear axle assemblies including the differentials 11, and wheels 12 which are preferably provided with pneumatic tires. Extending from the front and rear axles are the drive shafts 13 which are connected to the centrally located differential 14.

15 represents a jack shaft extending from the differential 14 and providing power for the same to drive the wheels 12. On the outer end of the shaft 15 is mounted a beveled gear 16 which meshes with a second beveled gear 17 mounted on the lower end of the vertical tubular shaft 18. The shaft 18 is supported by the upper and lower anti-friction bearings 19 and 20.

21 represents the circle-gear-casting which is fixed to the chassis and from which depends the housing 22 enclosing the beveled gears 16 and 17 and supporting the housing 23 of the differential 14.

The casting 21 is provided with the upwardly extending hub bearing 24 in which is journaled the bronze or other bushing 25. The bushing 25 is secured, as by screws 26, on the depending tubular spindle 27. The upper end of the spindle 27 is cup-shaped to form the oil reservoir 28. The rotary table 29 is provided with an axial opening having a recessed perimetral edge 30 into which the bottom of the reservoir 28 is stepped. The bolts 31 with the stepped portion of the reservoir secure the spindle 27 to the table 29. 32 represents reenforcing ribs on the spindle. The table 29 is provided with hook rollers 29a which engage the track 21a on the circle-gear-casting 21 as shown in Fig. 2. It will be understood that at least three of these rollers are properly spaced about the table.

The anti-friction bearings 19 and 20 are supported in the bore of the spindle, which bore is intermediately enlarged to form an extension of the oil reservoir 28. 33 represents radially disposed oil ducts in the spindle 27 and the bushing 25 to feed oil between the mating surfaces of the bushing and the hub bearing 24.

34 represents a dirt guard carried by the bushing 25 and overlying the hub bearing 24, and 35 represents an oil seal carried on the upper end of the hub bearing for preventing the escape of oil.

The upper anti-friction bearing 19 is supported from below by the shoulder 36 in the bore of the spindle 27 and is held down in place by the beveled gear 40. The lower anti-friction bearing 20 is held down by the shoulder 38 in the bore of the spindle and is supported from below by the beveled gear 17. 39 represents a drain plug in the bottom of the casing 22 for drawing the oil from the assembly. The oil bath extends from the upper reservoir 28, through the hollow spindle 27 to the casing 22.

40 represents a relatively large beveled gear mounted on the upper end of the tubular shaft 18 and rotating in the oil reservoir 28. The gear 40 meshes with a second beveled gear 41 which is loose on the horizontal intermediate shaft 42 carried in the bearings 42a. 43 represents the boom hoist drum of the shovel or crane arranged to run free on the shaft 42. Working between the gear 41 and the boom hoist drum 43 is the clutch collar 44 splined to the shaft 42 and having conventional clutch fingers on both ends thereof, which when moved to the right in Fig. 1 engages complemental fingers on the gear 41 and causes it to rotate with the shaft 42, but when moved to the left in Fig. 1 releases the gear and engages the corresponding fingers on the boom hoist drum 43 locking it to the shaft.

The shaft 42 is driven from the motor 45 through the clutch 46 and the transmission 47 which provides speed regulation and reversal of direction of the rotation of the shaft 42, as will be explained in detail later.

48 represents the tubular steering shaft which is nested in the tubular driving shaft 18.

49 is an annular bearing housing secured to the top of the gear 40 and is concentric therewith. Mounted within said housing are the anti-friction bearings 50 for supporting the upper portion of the shaft 48, and which are held in place by the cap 51. 52 indicates an oil passageway leading from the bearings 50 down between the driving shaft 18 and the steering shaft 48 to the casing 22.

Above the bearings 50 a beveled pinion 53 is fixed on the end of the steering shaft 48. The pinion 53 meshes with a second beveled pinion 54 fixed on the horizontal steering shaft 55 which extends toward the front of the turntable along the center line of the boom. The other end of the shaft 55 is provided with the beveled gear 56 meshing with the beveled gear 57 on the shaft 58 disposed at right angles to the shaft 55. The end of the shaft 58 is provided with a beveled gear 59 which meshes with a beveled gear 60 at the bottom of the steering post 61 which carries the ordinary steering wheel 62 at the top thereof. The steering wheel 62 is preferably removable so that the operator may have unobstructed use of the controls at his station when manipulating the shovel or crane.

Intermediate of the ends of the drive shaft 58 I provide a steering brake comprising a simple brake band operated by the foot pedal 63 as shown in Fig. 7. Thus when the operator is working the shovel with the steering wheel removed from the post 61 and he desires to guide the vehicle to the right or left as he moves it up to the excavation or work, he merely depresses the steering brake pedal 63, locking the steering shafts 55, 58 and then swings the turntable, causing the locked shafts to properly direct the front or driving wheels 12 of the chassis. The locked steering shafts 55, 58 prevent rotation of the beveled gear 54 on the end thereof. Since the teeth of the beveled gear 54 are in constant mesh with the teeth of the beveled gear 53, which is secured on the upper end of the vertical steering shaft 48, any rotary movement of the turntable, on which the horizontal steering shafts 55 and 58 are supported, rotates the vertical shaft therewith, thus moving the front wheels in the direction in which the turntable is swung. The operator may thus steer the vehicle by the turntable swing control. This operation materially reduces the operating time of the shovel as the operator may at the same time reposition the dipper for another scoop from the excavation. The detailed operation of the controls for performing these functions will be described later.

Referring again to Fig. 1, the shaft 48 extends down through the gear 17 and within the housing 22. The lower end of the shaft 18 is reduced in exterior diameter and threaded to have screwed thereon the collar 64 which is held against relative movement as by screws 65.

Below the lower extremity of the shaft 18 the shaft 48 is reduced in external diameter and its lower end is rotatably received in a sleeve bushing 66 which is fixedly mounted in a collar 67 secured in a flanged opening in the bottom of the housing 22. The lower end of the bushing 66 is provided with a lubricant seal 68 to prevent the downward escape of lubricant along the shaft 48. 69 represents a radial passage admitting lubricant from the interior of the housing to the mating surfaces of the shaft and bushing.

70 represents a tubular worm shaft mounted on and fixed to the reduced portion of the shaft 48. This worm shaft is provided with the top and the bottom thrust bearings 71.

The worm thread on the perimetral surface of the worm 70 is engaged by the tapered extremity of a roller 72 on the end of the stub shaft 73 which is journaled in anti-friction bearings 74 carried by the end of a crank 75 as shown in Fig. 4. The shaft 75a is journaled in sleeve bearings 76 which extend beyond the housing 22. The end of the shaft 75a which extends through the housing 22 has secured thereto the upwardly extending crank or lever 77 as shown in Fig. 4. This crank is also shown in dotted lines in Fig. 2. The upper end of the lever 77 is connected to the steering rod and gear 78 for guiding the front wheels, which are those shown at the right in Figs. 2 and 3.

Referring to Fig. 1, the upper end of the steering shaft 48 is provided with an air swivel joint member 79 to which is connected the compressed air line 80 which in turn is provided with a suitable mechanism operated by the foot pedal 81 at the operator's station.

82 represents a like swivel joint connected to the lower end of the shaft 48 and which in turn is connected through the line 83 to the compressed air brake operating mechanism on the traction wheels 12. As such air brake mechanism is well known in the motor vehicle art the same has not been specifically shown.

It will be understood that mechanically or hydraulically operated brakes may be used; in which case their actuating means would extend concentrically of the nested shafts in a manner similar to that described. I prefer the use of pneumatically operated brakes, as the shovel operating mechanism is controlled by compressed air.

Referring to Fig. 3, the shaft 42 is driven from the motor 45 through the clutch 46, the transmission 47, the herringbone spur gear 84, on the drive shaft 85, which is in constant mesh with the large herringbone gear 86 which is secured to the main hoist shaft 87 journaled in the bearings 88. 89 represents a sprocket gear keyed to the shaft 87 and arranged to drive the intermediate shaft 42 through the chain 90 engaging the sprocket gear 91 keyed to the shaft 42.

92 represents diagrammatically the shifting rods operated by the lever 93 in back of the operator's station for shifting the clutch collar 44 to the boom hoist drum 43 or to the large beveled gear 41 for driving the vehicle.

The main motor clutch 46 may be operated by means of clutch rods connected to the clutch pedal 94 located in the usual clutch position at the operator's station. The gear selection of the transmission 47 is obtained by manipulation of the rod 95 and the gear lever 96 located to the right of the steering wheel 62. Thus the operator may disengage the clutch 46, select the proper gear in the transmission 47, and engage the clutch collar 44 for propelling the vehicle from the same station that he manipulates the shovel mechanism.

The shovel or crane operating mechanism is all assembled on the turntable. 97 represents the boom which is pivotally mounted on the shaft 98 at the front of the turntable. The boom hoist drum 43 is arranged to receive the end of a cable which passes over the vertical sheave 99 which extends through the floor of the turntable; around horizontal sheave 100 under the motor block 45; around the vertical sheave 101 which extends below the turntable as shown in Fig. 2, and around the sheaves 102 on top of the mast 103 to sheaves in the head block of the boom.

104 represents the crowding mechanism on the intermediate shaft 42 between the large beveled gear 41 and the sprocket 91. From the center of the turntable the first band member 105, which is operated by the air-set, spring-release cylinder 106, is the in-crowd friction. The next band member 107, operated by the spring-set air-release cylinder 108, is the crowd brake. The band member 109, operated by the air-set, spring-release cylinder 110, is the out-crowd friction. These frictions and brakes are arranged to operate the crowd drum 111 having the removable sprocket 112 arranged to drive the chain 113 and the sprocket 114 on the spool 115 which is rotatably mounted on the boom fulcrum shaft 98. The other end of the spool is provided with the sprocket 116 and the crowd chain 117 that passes to the dipper sticks on the boom, which are not shown.

118 represents a hand-brake band member operated by the brake handle 119 for braking the rotary movement of the shaft 42. This brake acts as an emergency brake when driving the vehicle along the road. It also acts to retard the movement of the boom hoist drum or the crowding mechanism when operating the shovel or other apparatus.

Mounted on the main hoist drum shaft 87 is the friction band member 120 for the main hoist drum 121, operated by the air-set, spring-release cylinder 122. 123 represents the brake band for the main hoist drum operated by the spring-set, air-release cylinder 124.

The next adjacent apparatus on the main hoist shaft is the swinging mechanism 125. The friction band member 126 operated by the air-set, spring-release cylinder 127, is arranged to operate the beveled gear 128 which is in constant mesh with the beveled gear 129, to rotate the latter in a counterclockwise direction. The beveled gear 129 is arranged to operate a vertical stub shaft having a spur gear meshing with the circle gear on the circle gear casting 21. Thus a counterclockwise direction of said stub shaft swings the turntable to the left as the spur gear walks around the circle gear.

The friction band member 130 operated by the air-set, spring-release cylinder 131 operates the beveled gear 132 which is in constant mesh with the beveled gear 129. This friction drive is arranged to rotate the vertical stub shaft and spur gear in a clockwise direction, causing the latter to walk around the circle gear of the circle gear casting 21 and thus swing the turntable to the right.

133 represents a friction brake band member operated by the spring-set, air-release cylinder 134 for braking the swinging mechanism.

It should be noted that all of the friction brakes are spring-set, air-released, and that all of the friction drives are air-set, spring-released. The employment of this type of friction operation materially simplifies the control of the mechanism. Thus complete control is gained through the two control levers 135 and 136, which are positioned to the right and left of the steering post 61 at the operator's station.

These levers are arranged on a ball and socket mounting so that they may be moved in any direction. The control valve casing 137 and 138 are provided with a pneumatic control valve in each quadrant; forward and back, left and right. These valves are operated by the control levers 135 and 136. These levers are arranged so that they will always return to the center or neutral position when released.

When the right hand control lever 135 is moved to the rear, air is supplied through the pipe 140 to the hoist friction cylinder 122 for operating the band 120, causing the main hoist drum to reel in the cable 121 thereon. The air line 140 is also directed to a double acting ball valve 141 which permits the air to enter the cylinder 124 to release the brake band 123 but prevents the air from entering the air brake line. The structure of this ball valve is shown in Fig. 6.

When the lever 135 is moved forward air is supplied to the air brake line 142 and flows through the double acting ball valve 141, shutting off the main hoist air line and passes to the cylinder 124 to release the main hoist brake band 123.

When the lever 135 is moved to the right, regardless of its forward or rearward position, the air travels through the air line 143 to trip the dipper, and when the lever 135 is moved to the left air is supplied through the pipe 144 to a double acting ball valve 145 whence it passes through the line 146 to a second double acting ball valve 147 and thence through the pipe 148 to the cylinder 108 for releasing the crowd brake band 107 to permit gravity crowd of the dipper sticks.

Referring now to the control lever 136 which, when moved to the rear, supplies air through the pipe 149 to the in-crowd cylinder 110, for operating the friction band 109 to draw the dipper sticks in. The air line 149 is also connected to the other side of the second double acting ball valve 147 and admits air through the pipe 148 to the cylinder 108 for releasing the crowd brake 107.

When the control lever 136 is moved forwardly air through the pipe 150 is supplied to the cylinder 106 for operating the out-crowd friction 105. The pipe 150 is also connected through a pipe 151 to the other side of the first double acting ball valve 145, which closes the port to the pipe 144, to the valve actuated by the left movement of control lever 135, and passes through the pipe 146, as described above, to the second double acting ball valve 147, which closes the port to the in crowd air line 149, so that the air then passes through the pipe 148 to the cylinder 108 to release the crowd brake band 107.

When the control lever 136 is moved to the right, air is directed through the pipe 152 to the cylinder 131 for operating the right swing friction band 130. The pipe 152 is also connected to one port of a double acting ball valve 153 for admitting air through a pipe 154 to the cylinder 134 to release the swing brake band 133.

When the control lever 136 is moved to the left air is directed through the pipe 155 to the cylinder 127 for operating the left friction swing 126. The pipe 155 is also connected to the opposite port of the double acting ball valve 153 to close the port to the right swing air pipe 152 and to admit air through the pipe 154 to the cylinder 134 to release the swing brake 133.

Thus by the use of air-set, spring-released friction drives and spring-set, air-released friction brakes, the double acting ball valves, and the ball and socket control levers, I am enabled to provide the operator with finger-tip control of a power shovel or the like.

As described above, when operating the shovel, the steering wheel 62 is removed from its post 61 and the vehicle then may be guided by using the right or left swing and the foot steering brake 63. Thus the operator is given complete control of the shovel at all times without his shifting of position, which increases his ability to dig and move up to the work most rapidly. At the same time he is able to watch the movements of his machine and thereby avoid accidents. Other machines of this type require considerable time in shifting positions and changing hands for operating different controls, all of which take time and distract the operator's attention, sometimes resulting in serious accidents.

156 represents the accelerator pedal for controlling the speed of the motor. 157 represents one or more compressed air tanks on the turntable, which tanks may be supplied by the pump 158 operated from the crank shaft of the motor 45. Thus air is supplied to the tanks 157 when the motor 45 is operating. One tank may be used for reserve to supply air if the motor fails at an inopportune time, as for instance when the vehicle is traveling along the highway.

159 represents a fuel supply tank for the motor 45.

I claim:—

1. In a vehicle of the character described, the combination of a dirigible chassis, a turntable rotatably mounted on the chassis, means for turning the table in either direction, a vertical shaft extending from the turntable through the axis of rotation thereof to the chassis for steering the same, means including said shaft for steering the chassis from the turntable, and means for locking said shaft relative to the rotary turntable to guide the chassis by movement of the turntable.

2. In a vehicle the combination of a dirigible chassis, a turntable rotatably mounted on the chassis, a vertical shaft extending from the turntable through the axis of rotation thereof to the chassis for steering the same, means on the turntable for operating said shaft to steer the chassis, and mean for locking said shaft relative to said turntable to steer the chassis by rotating the turntable.

3. In a vehicle the combination of a dirigible chassis, a turntable rotatably mounted on the chassis, a vertical shaft extending from the turntable through the axis of rotation thereof to the chassis for steering the same, means on the turntable for operating said shaft to steer the chassis, and mean for operating said shaft by the swinging movement of the turntable for steering the chassis.

LELAND O. McLEAN.